(12) United States Patent
Jones

(10) Patent No.: US 7,729,551 B2
(45) Date of Patent: Jun. 1, 2010

(54) METHOD FOR CONTROLLING THE AMOUNT OF COMPRESSED DATA

(75) Inventor: Paul W. Jones, Churchville, NY (US)

(73) Assignee: Eastman Kodak Company, Rochester, NY (US)

(*) Notice: Subject to any disclaimer, the term of this patent is extended or adjusted under 35 U.S.C. 154(b) by 936 days.

(21) Appl. No.: 11/517,978

(22) Filed: Sep. 8, 2006

(65) Prior Publication Data

US 2008/0063293 A1    Mar. 13, 2008

(51) Int. Cl.
G06K 9/36    (2006.01)

(52) U.S. Cl. .................................... 382/240

(58) Field of Classification Search ......... 382/232–233, 382/235, 239–240, 248–252; 358/1.2, 539; 348/395.1–396.1, 403.1–406.1; 375/240.01–240.02, 375/240.12, 240.14, 240.18–240.2, 240.24–240.25
See application file for complete search history.

(56) References Cited

U.S. PATENT DOCUMENTS

| | | | |
|---|---|---|---|
| 4,780,761 A | 10/1988 | Daly et al. | |
| 6,349,151 B1 | 2/2002 | Jones et al. | |
| 6,650,782 B1 | 11/2003 | Joshi et al. | |
| 6,658,162 B1 * | 12/2003 | Zeng et al. | 382/251 |
| 6,668,090 B1 | 12/2003 | Joshi et al. | |
| 6,785,423 B1 * | 8/2004 | Joshi et al. | 382/235 |
| 6,885,395 B1 * | 4/2005 | Rabbani et al. | 348/231.1 |
| 7,382,926 B2 * | 6/2008 | Joshi et al. | 382/240 |
| 2005/0100229 A1 | 5/2005 | Becker et al. | |
| 2007/0053598 A1 | 3/2007 | Mizuno | |

FOREIGN PATENT DOCUMENTS

EP    1 158 773    11/2001

OTHER PUBLICATIONS

M. Rabbani, R. Joshi, An Overview of JPEG2000 Still Image Compression Standard, Signal Processing: Image Communication, vol. 17, pp. 3-48, 2002.
D.S. Taubman, M.W. Marcellin, *JPEG2000 Image Compression Fundamentals, Standards and Practice*, Kluwer Academic Publishers, Boston, MA, pp. 339-348, 2002.
Young Huh, et al., "The New Extended JPEG Coder with Variable Quantizer Using Block Wavelet Transform", IEEE Transactions on Consumer Electronics, vol. 43, No. 3, Aug. 1, 1997, pp. 401-409.

(Continued)

*Primary Examiner*—Jose L Couso
(74) *Attorney, Agent, or Firm*—Stephen H. Shaw

(57) ABSTRACT

A method is disclosed for controlling the amount of compressed data. One or more viewing condition parameters are specified, and a quantizer step size for each frequency subband is determined that minimizes an amount of data that must be encoded for a compressed representation of the image by using one or more viewing condition parameters and a model that characterizes the human visual system. The image is compressed using the quantizer step size for each frequency subband to produce an amount of compressed data. The presence of a pre-specified maximum amount of compression data is determined. The amount of compressed data is compared to the pre-specified maximum amount. Subsequent discarding of least visually relevant compressed data reduces the amount of compressed data.

24 Claims, 11 Drawing Sheets

OTHER PUBLICATIONS

"JPEG 2000 Part I Final Committee Draft Version 1.0", ISO/IEC JTC 1/SC 29/WG 1 N1646, Mar. 16, 2000, pp. A,B,I-XII, 1.

Mathias Larsson Carlander, "JPEG2000 Verification Model 9.1", ISO/IEC JTC 1/SC 29/WG 1 WG1 N2165, Jun. 28, 2001, pp. 1-214.

Wenjun Zeng, et al., "An Overview of the Visual Optimization Tools in JPEG 2000", Signal Processing Image Communication, vol. 17, No. 1, (2002), pp. 85-104.

* cited by examiner

METHOD FOR CONTROLLING THE AMOUNT OF COMPRESSED DATA

FIELD OF THE INVENTION

The invention relates generally to the field of digital image processing, and in particular to a method for efficiently controlling the compressed data rate in JPEG2000 image compression.

BACKGROUND OF THE INVENTION

JPEG2000 is a sophisticated image compression technique that offers a rich set of features to meet the needs of different applications. These features can be achieved, because of the properties of the various components that form a JPEG2000 compression system. A brief description of these components is provided in the following, and a more complete description can be found in the paper by M. Rabbani and R. Joshi entitled, "An overview of the JPEG 2000 still image compression standard," Signal Processing: Image Communication, Vol. 17, pp. 3-48, 2002.

FIG. 1 illustrates the basic components in a JPEG2000 compression system. The original image data is initially sent to a pre-processor 10, where several modifications to the original image data may take place. One possible modification is a color transformation known as the irreversible color transform (ICT). This transform is designed to convert red-green-blue (RGB) image data into a single luminance (Y) and two chrominance (Cb, Cr) components for improved compression performance. The pre-processed data is then transformed using a discrete wavelet transform 12, which converts the spatial image data into wavelet coefficients that correspond to a plurality of spatial frequency subbands. The wavelet coefficients are quantized with a uniform quantizer 14 that includes a deadzone. Quantization is a many-to-one mapping that reduces the amount of data that is used to represent the wavelet coefficients, at the expense of errors in the image that is reconstructed from the quantized wavelet coefficients. The degree of quantization for each frequency subband is determined by a quantizer step size (denoted as Q(f) in FIG. 1) that is associated with the subband. It is common in JPEG2000 systems to specify a single base step size for quantization, and then derive a set of quantizer step sizes that correspond to the various frequency subbands by using properties of the wavelet transform (i.e., from the band gain factors for each of the frequency subbands). Alternatively, it is possible to specify an explicit set of quantizer step sizes for the frequency subbands for more precise control of the quantization.

The quantized wavelet coefficients are then partitioned into small codeblocks, and the quantized coefficients from each codeblock are encoded as bitplanes using an adaptive binary arithmetic encoder 16. This step is referred to as Tier-1 coding. Finally, the compressed codestream is produced by arranging the encoded codeblock data in various ways using a bitstream organizer 18. This step is referred to as Tier-2 coding. In Tier-2 coding, it is possible to discard encoded data corresponding to one or more bitplanes of the quantized wavelet coefficients, which will reduce the amount of compressed data at the cost of increased error in the decompressed image. The discarding of a bitplane from a given wavelet coefficient is equivalent to coarser quantization of that coefficient. If the quantizer step size that is initially applied to a coefficient is denoted as $\Delta$, the effective quantizer step size after discarding k of the least significant bit planes is $2^k \cdot \Delta$. This relationship between the discarding of coefficient bit planes and the resulting degree of quantization is described by Joshi et al. in U.S. Pat. No. 6,650,782.

The flexibility that is achieved in JPEG2000 comes at the price of high computational complexity, and it is desirable to reduce this complexity while still providing a desired level of image quality. This high computational complexity is particularly a problem in motion imaging applications, where there can be a large number of frames in a sequence that must be encoded with high throughput for the encoding system so as to be economical in time and computing resources. A significant part of the computational load in a JPEG2000 encoder occurs during the Tier-1 coding, in which quantized wavelet coefficients are encoded using an arithmetic coder to form compressed data. After Tier-1 coding, it is common to discard a significant amount of the compressed data during Tier-2 coding to achieve a pre-specified size for the compressed codestream, or alternatively to achieve a pre-specified level of distortion in the image that is reconstructed during decompression. This process of varying the amount of compressed data is known as rate control.

One common rate control method for JPEG2000 is post-compression rate-distortion optimization (PCRD-opt). Some variation of PCRD-opt is found in most JPEG2000 software and hardware encoders, and a complete description can be found in the book entitled *JPEG2000 Image Compression Fundamentals, Standards and Practice*, D. S. Taubman and M. W. Marcellin, pp. 339-348, Kluwer Academic Publishers, Boston, Mass., 2002. A typical goal in applying PCRD-opt is to achieve a fixed size for the compressed codestream, regardless of the image content. Compression systems that produce a constant compressed size are known as constant bit rate (CBR). In a typical JPEG2000 implementation, using PCRD-opt, the wavelet coefficients are finely quantized, which produces a large amount of compressed data during Tier-1 coding. A PCRD-opt algorithm determines which data should be discarded to meet the pre-specified size by analyzing the impact of discarding the data on the compressed codestream size and the resulting distortion that is incurred in the decompressed image. The goal is to minimize the overall distortion subject to achieving the desired final size of the compressed data. The advantage of using finely quantized wavelet coefficients with a PCRD-opt algorithm is that it is possible to precisely control the amount of compressed data, so that the codestream size is as close as possible to the pre-specified limit without exceeding the limit. However, this approach is also time-consuming, because the formation of the compressed data from the finely quantized coefficients in Tier-1 coding requires significant computations, yet much of it is discarded in the subsequent rate control process. This is the problem of overcoding. Note also that the evaluation of the excess compressed data also increases the processing time during Tier-2 coding.

Although a PCRD-opt algorithm is typically used to minimize the overall distortion subject to a constraint on the maximum compressed codestream size, it is also possible to use variations of a PCRD-opt algorithm to minimize the compressed codestream size subject to a constraint on the overall distortion. Such a system produces an approximately constant distortion and the compressed codestream size fluctuates with the image content. Compression systems that attempt to produce constant quality by allowing the compressed size to vary with the image content are known as variable bit rate (VBR). VBR systems are generally preferred over CBR systems, because VBR systems typically produce a smaller average compressed size than CBR for comparable image quality over an ensemble of images that vary in content. However, from a computational point of view, VBR systems still suffer from the problem of overcoding, if the transform coefficients are finely quantized prior to the arithmetic coder in Tier-1 Coding.

One method for minimizing the amount of overcoding is taught by Becker et al. (US Application 2005/0100229) for motion image sequences. However, this method requires accurate estimation of certain parameters and requires additional logic as a replacement for, or as an extension of, PCRD-optimization. Most JPEG2000 encoders would need modifications to practice the method taught by Becker et al., and the method is also not appropriate for compressing individual image frames. More importantly, this method may fail when image content changes rapidly, such as occurs at scene boundaries in motion sequences.

Another limitation in current systems, whether CBR or VBR, is the distortion metric that is commonly used to quantify image quality, i.e., mean-squared error (MSE). MSE is a measure of the numerical difference between pixel values of the original image and the pixel values of the decompressed image. A related metric to MSE is peak signal-to-noise ratio (PSNR), which is specified using deciBell (dB) units. These metrics are mathematically convenient, but it is well known that they do not always correlate with perceived quality. As a result, even if a specific MSE or PSNR is obtained, there is no assurance of a given level of perceived image quality. For many applications, the goal may be visually lossless quality, i.e., the decompressed image appears to be identical to the original image when both are viewed by a human observer under specified viewing conditions. Knowledge of the MSE or PSNR for a compressed image does not provide any information about the viewing conditions under which visually lossless quality will be obtained.

For example, given a compressed image with a PSNR of 40 dB, it is impossible to know a priori what viewing conditions will yield visually lossless quality for the image. It may be that the perceived quality is not visually lossless under specified viewing conditions, or it may be that visually lossless quality is obtained, but more compressed data was used than was necessary to achieve that quality. The first scenario results in lower perceived image quality than desired, while the second scenario results in a larger compressed codestream than is necessary for visually lossless quality. Thus, it is not sufficient to rely strictly upon MSE or PSNR as a quality metric. This is particularly the case for VBR systems, where one wants to produce a known level of perceived image quality, while also compressing the image to the minimum amount of data that is needed for the desired quality.

Another issue that arises in some JPEG2000 applications is the need to satisfy a maximum compressed codestream size for each image. One such application is in Digital Cinema (DCinema) compression. The Digital Cinema Initiative (DCI), a consortium of the major US studios, has recently developed a set of specifications to ensure a certain level of interoperability among DCinema equipment manufacturers. One specification calls for a constraint on the maximum compressed codestream size for each image, with additional restrictions on the maximum amount of compressed data that can be used to represent each color component in an image. The DCI constraint on the maximum compressed codestream size is 1,302,083 bytes per frame for each image frame in an image sequence having 24 frames per second. This constraint on the maximum codestream size can be equivalently specified as a maximum compressed data rate of 250 Megabits/sec (Mbps). The amount of compressed data for each color component in an image frame can be a maximum of 1,041,066 bytes, which is equivalent to a compressed data rate of 200 Mbps for an image sequence having 24 frames per second.

These specifications are driven mainly by the capabilities of current JPEG2000 decompression systems. While CBR systems could always meet these data constraints through a rate control algorithm such as PCRD-opt, it is not a preferred solution, because of the typically larger average codestream sizes for CBR as compared to VBR systems. Thus, it is desirable to have a VBR system that provides constant perceived quality to the greatest extent possible, while still meeting any constraints on the maximum amount of compressed data for each image.

Thus, there is the need for a JPEG2000 compression system that: (1) minimizes the amount of overcoding so that computational complexity is reduced for both CBR and VBR systems; (2) produces compressed codestreams that meet constraints on the maximum amount of compressed data for both CBR and VBR systems; and (3) produces constant perceived image quality for VBR systems, while minimizing the amount of compressed data to achieve that level of image quality.

SUMMARY OF THE INVENTION

The present invention is directed to overcoming one or more of the problems set forth above. Briefly summarized, according to one embodiment of the present invention, a method is disclosed for controlling the amount of compressed data that is used to represent an image when the image is compressed as a plurality of frequency subbands and subsequently decompressed and viewed on a display by a human observer, comprising the steps of:

(a) specifying one or more viewing condition parameters;

(b) determining a quantizer step size for each frequency subband that minimizes an amount of data that must be encoded for a compressed representation of the image, by using the one or more viewing condition parameters and a model that characterizes the human visual system;

(c) compressing the image using the quantizer step size for each frequency subband to produce an amount of compressed data;

(d) determining presence of a pre-specified maximum amount of compression data; and (e) reducing the amount of compressed data by discarding least visually relevant compressed data, if the amount of compressed data exceeds the pre-specified maximum amount.

ADVANTAGEOUS EFFECT OF THE INVENTION

The present invention has the following advantages:

It is an advantage of the method of the present invention that it minimizes overcoding in JPEG2000 compression, so as to achieve improved computational efficiency.

It is a further advantage of the method of the present invention that it can provide a known level of perceived image quality that is quantified by threshold viewing distance.

It is still another advantage of the method of the present invention that constant perceived quality can be obtained with the minimum amount of compressed data that is needed to provide visually lossless image quality for specified viewing conditions.

It is yet another advantage of the method of the present invention that it can be utilized in most JPEG2000 encoders without any modifications to the encoder.

These and other features and advantages of the present invention will become apparent to those skilled in the art upon a reading of the following detailed description when taken in conjunction with the drawings that show and describe an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
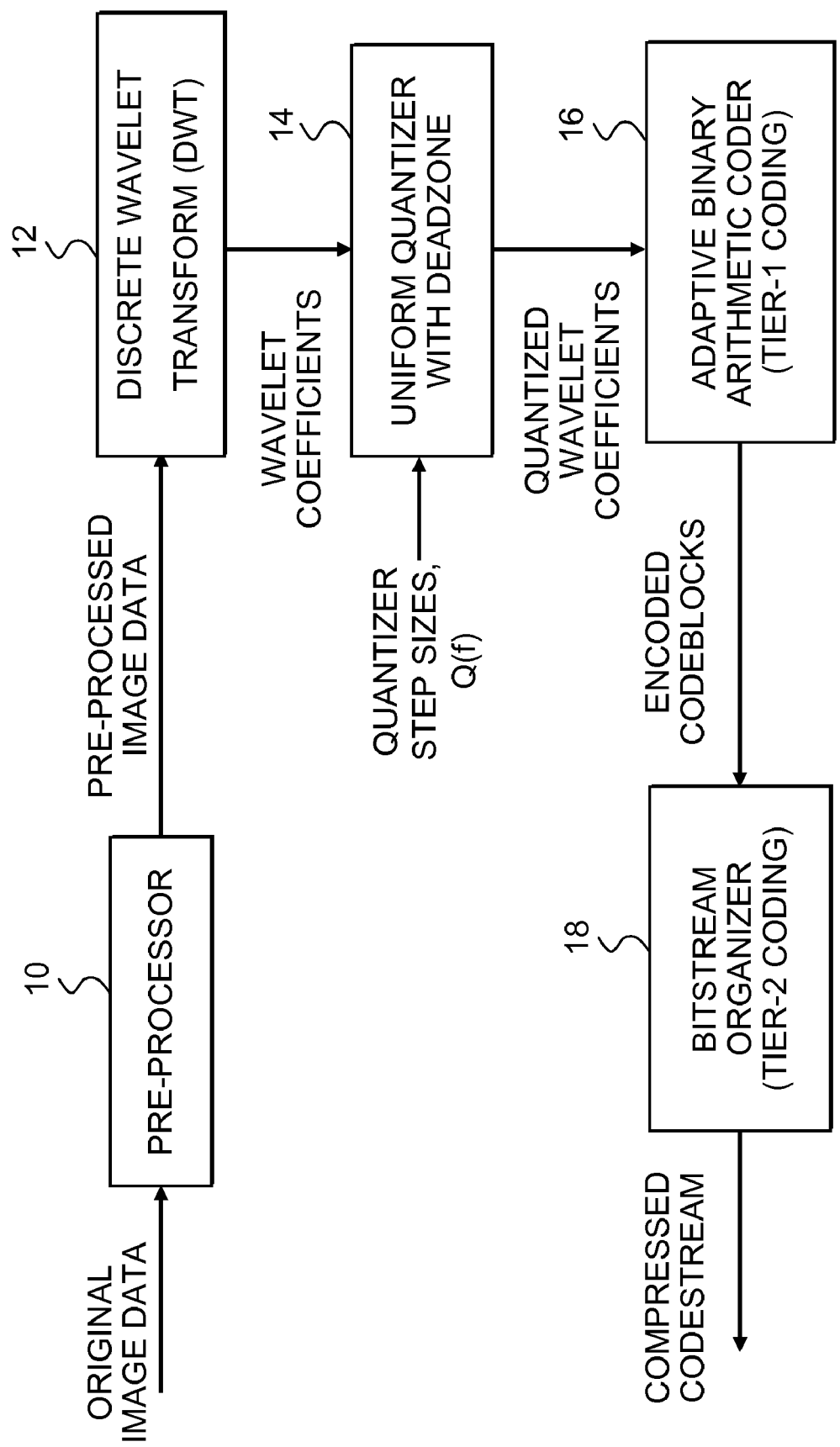
FIG. 1 is a block diagram illustrating the basic components of a prior art JPEG20000 compression system.

The present description is directed in particular to elements forming part of, or cooperating more directly with, apparatus in accordance with the invention. It is to be understood that elements not specifically shown or described may take various forms well known to those skilled in the art.

As discussed previously, the computational complexity of JPEG2000 compression systems can be quite high, because of the arithmetic encoding that occurs in Tier-1 coding. In a typical JPEG2000 compression system, the quantizer step sizes are selected so as to produce finely quantized coefficients, which generate a significant amount of data to be encoded. However, during the formation of the compressed codestream in Tier-2 coding, much of the arithmetic-encoded data is subsequently discarded to achieve a desired compressed codestream size. This is the problem of overcoding, where all of the quantized coefficient data is encoded, but not all of it is included in the final codestream.

The present invention addresses the issue of overcoding by generating only a limited amount of quantized coefficient data as input into the arithmetic coder in Tier-1 coding. In this way, there is less data that must be processed by the arithmetic coder, and subsequently, there is also less data that must be evaluated when organizing the final codestream during Tier-2 coding. However, one must be very careful in determining what quantized coefficient data is generated, because it is entirely possible to introduce noticeable artifacts in the decompressed image, if the quantization is too coarse. To prevent the introduction of artifacts, the present invention uses a model that characterizes the human visual system, together with the intended viewing conditions, to determine quantizer step sizes for the wavelet frequency subbands, where the quantizer step sizes are optimal in terms of limiting the amount of overcoded data that is generated, while still maintaining a desired level of perceived image quality. Viewing conditions include such parameters as the viewing distance (i.e., the distance from the observer to the display), the size and brightness of the display device, etc.

The application of a human visual system model to image compression is well known in the prior art. Daly et al. in U.S. Pat. No. 4,780,761 teach a method of quantizing transform coefficients according to a two-dimensional model of the sensitivity of the human visual system to spatial frequencies. In this method, the transform coefficients are produced by a discrete cosine transform (DCT). The use of a human visual system model for quantizing wavelet coefficients in the context of JPEG2000 has also been described in the prior art, including U.S. Pat. No. 6,650,782 and U.S. Pat. No. 6,668,090, both to Joshi et al. However, none of these prior art methods addresses the problem of overcoding in JPEG2000 or provides an efficient means to meet constraints on the maximum amount of compressed data. Before describing how the present invention solves these problems, it is useful to describe a human visual system model and how it can be applied to image compression.

Figure 2:
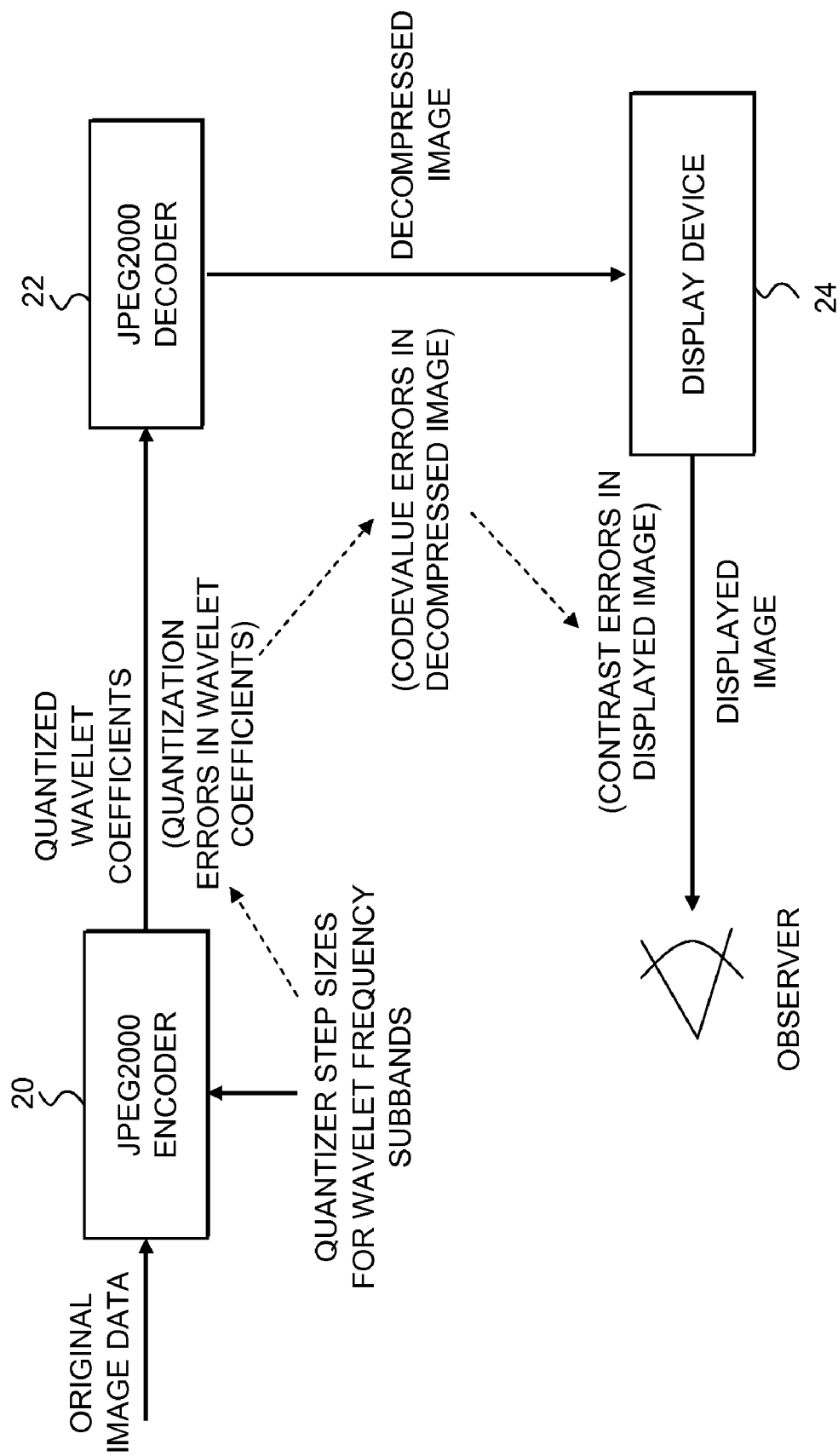
FIG. 2 is a block diagram illustrating the propagation of error from a JPEG2000 encoder to a displayed image.

Referring to FIG. 2, the propagation of error from JPEG2000 compression to the displayed image is illustrated. Original image data is compressed using a JPEG2000 encoder 20 with quantizer step sizes for the various wavelet frequency subbands. Quantization introduces errors in the quantized wavelet coefficients relative to the unquantized wavelet coefficients. The quantized wavelet coefficients are encoded and eventually passed to a JPEG2000 decoder 22, which reconstructs an image from the decoded quantized coefficients. The errors in the quantized coefficients result in errors in the decompressed image's codevalues relative to the original image's codevalues. When the decompressed image is sent to a display device 24, the displayed image can be viewed by a human observer. The displayed image contains contrast errors, because of the errors in the decompressed image codevalues. Given a combined JPEG2000 encoder/decoder and display system as was just described, the goal is to determine quantizer step sizes that will lead to contrast errors at the display that are not detectable by the human observer. Contrast has a specific meaning in the field of human psychophysical research.

Contrast is a measure of the brightness variation of a signal relative to its average brightness. Contrast can be defined in various ways depending upon the specific characteristics of the signal that is being viewed. One very common definition is:

$$\text{Contrast} = \frac{L_{max} - L_{min}}{L_{max} + L_{min}} = \frac{\Delta L}{2 \cdot L_{mean}}, \quad (1)$$

where $L_{max}$ is the maximum luminance of the signal, $L_{min}$ is the minimum luminance of the signal, $\Delta L$ is the difference between the minimum and maximum luminances, and $L_{mean}$ is the average luminance. This definition of contrast is known as Michelson contrast, and it is particularly appropriate for signals whose luminance varies sinusoidally. While the artifacts that are produced by wavelet compression techniques are not simple sinusoids, we have found that Michelson contrast works reasonably well in practicing the present invention.

For a sinusoidal stimulus with a spatial frequency f, it is possible to determine, through psychophysical experiments, the minimum contrast that is needed for an observer to detect the presence of the stimulus. This minimum detectable contrast is known as the contrast threshold for that frequency, which we denote as $C_t(f)$. Contrast sensitivity is defined simply as 1/(contrast threshold), which allows one to define a contrast sensitivity function (CSF) as:

$$CSF = 1/C_t(f) \forall f > 0. \quad (2)$$

Figure 3:
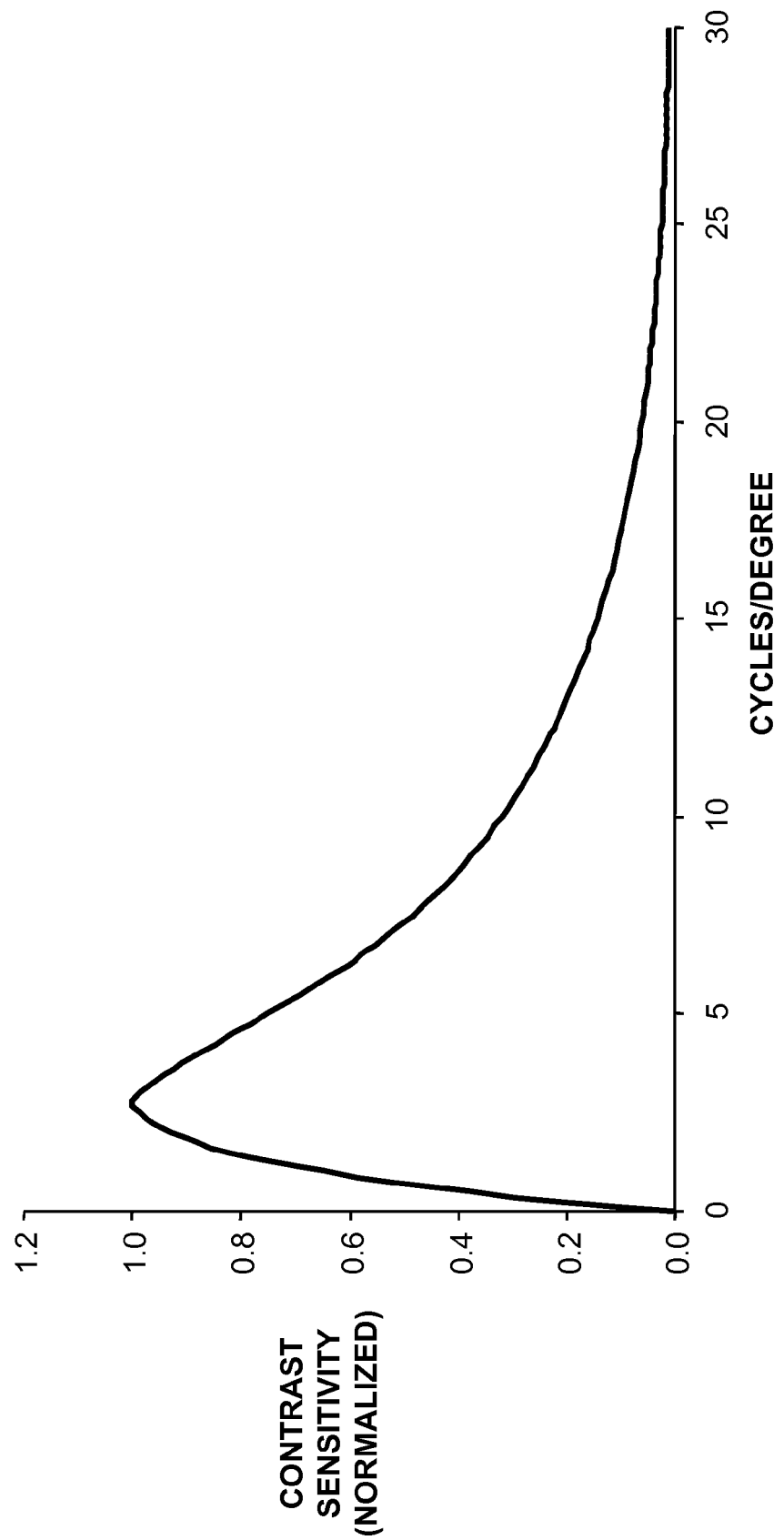
FIG. 3 is an example of a contrast sensitivity function for the human visual system.

FIG. 3 illustrates a typical contrast sensitivity function, where the spatial frequencies are given in units of cycles/degree of visual subtense. The shape of the contrast sensitivity function varies with a number of viewing condition parameters such as the average brightness level, the noise level of the display, orientation, etc., as is well known to those skilled in the art.

Figure 4:
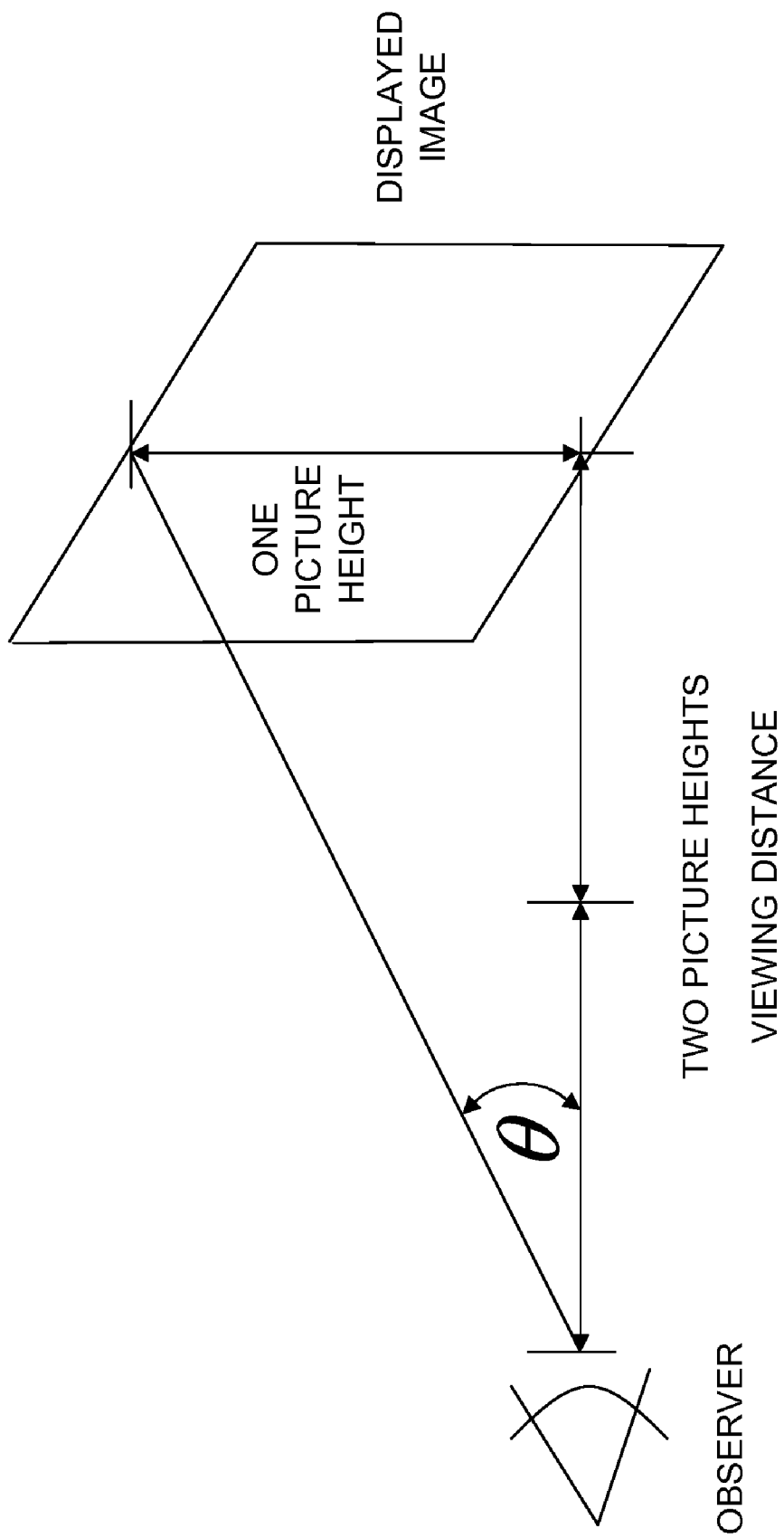
FIG. 4 is an illustration of viewing distance in units of picture heights.

One viewing condition parameter that is especially important when applying the CSF is the viewing distance. Once the intended viewing distance and the display characteristics are specified, it is possible to map the units of cycles/degree for the CSF to physical units on the display such as cycles/mm as outlined in U.S. Pat. No. 6,349,151 to Jones et al. However, the units of cycles/mm are a function of the specific display, and it was found to be convenient to map the CSF to units of cycles/picture height in embodiments of the present invention. In this way, the measurement units for size of the displayed pixels and the viewing distance are combined, and it is only necessary to specify the viewing distance in terms of the number of picture heights from the display to the observer to establish the proper scaling of the CSF spatial frequency axis. This concept of viewing distance in terms of picture heights is illustrated in FIG. 4 for a viewing distance of two picture heights. The total subtended angle for the displayed image is denoted as θ in FIG. 4. The units of cycles/degree can be converted to cycles/picture height by the following simple computation:

$$\text{cycles/picture height} = (\text{cycles/degree})(\theta \text{ degrees/picture height}) \quad (3)$$

For example, an image that is viewed at two picture heights will have a total subtended angle of $\theta = \tan^{-1}(1/2) = 26.6°$. A similar computation can be done for any desired viewing distance, e.g., the total subtended angle of a display at a viewing distance of one pictures height is $\tan^{-1}(1/1) = 45°$.

Figure 5:
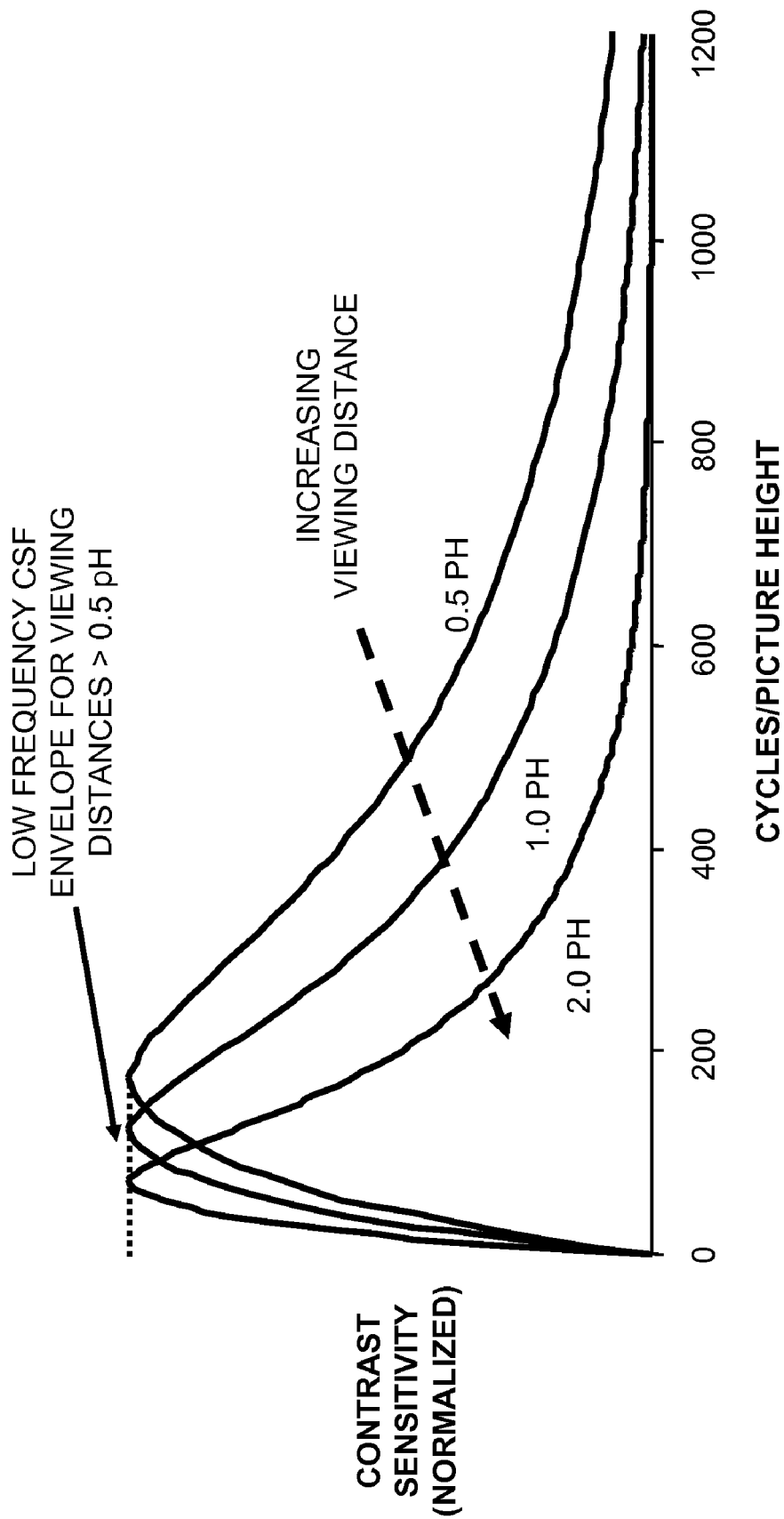
FIG. 5 is an illustration of the effect of viewing distance on a contrast sensitivity function.

The mapping of the CSF to cycles/picture height and the resulting effect of the viewing distance in picture heights is illustrated in FIG. 5 for viewing distances of 0.5, 1.0, and 2.0 picture heights (PH). As an observer moves further from the display, the CSF is mapped to lower spatial frequencies, and there is less sensitivity to the higher spatial frequencies. For cinema applications, it is common to use the term screen heights, instead of picture heights, where it is assumed that the image is projected so that its height approximately fills a movie screen. The terms picture height and screen height are essentially equivalent and will be treated as such, herein for the present invention. Alternatively, the viewing distance is sometimes specified in dimensions that relate to the size of displayed pixels. For example, if an image has a height dimension of 1000 pixels, then a two-picture height viewing distance could also be described as 2000 pixels, where a pixel has the same dimensions as a pixel shown on the display. The units of picture heights, screen heights, and display pixels to describe the viewing distance are easily interchangeable, but it can be advantageous to select one over the others depending upon the domain of the application.

Given the viewing distance and other viewing condition parameters such as display brightness, an appropriate CSF curve can be computed from a CSF model, such as the one described by Daly et al. in U.S. Pat. No. 4,780,761. One maps the CSF values (essentially a continuous function) to the discrete wavelet subbands. However, each wavelet subband contains a range of spatial frequencies, so one must select a single frequency to represent an entire subband.

Figure 6:
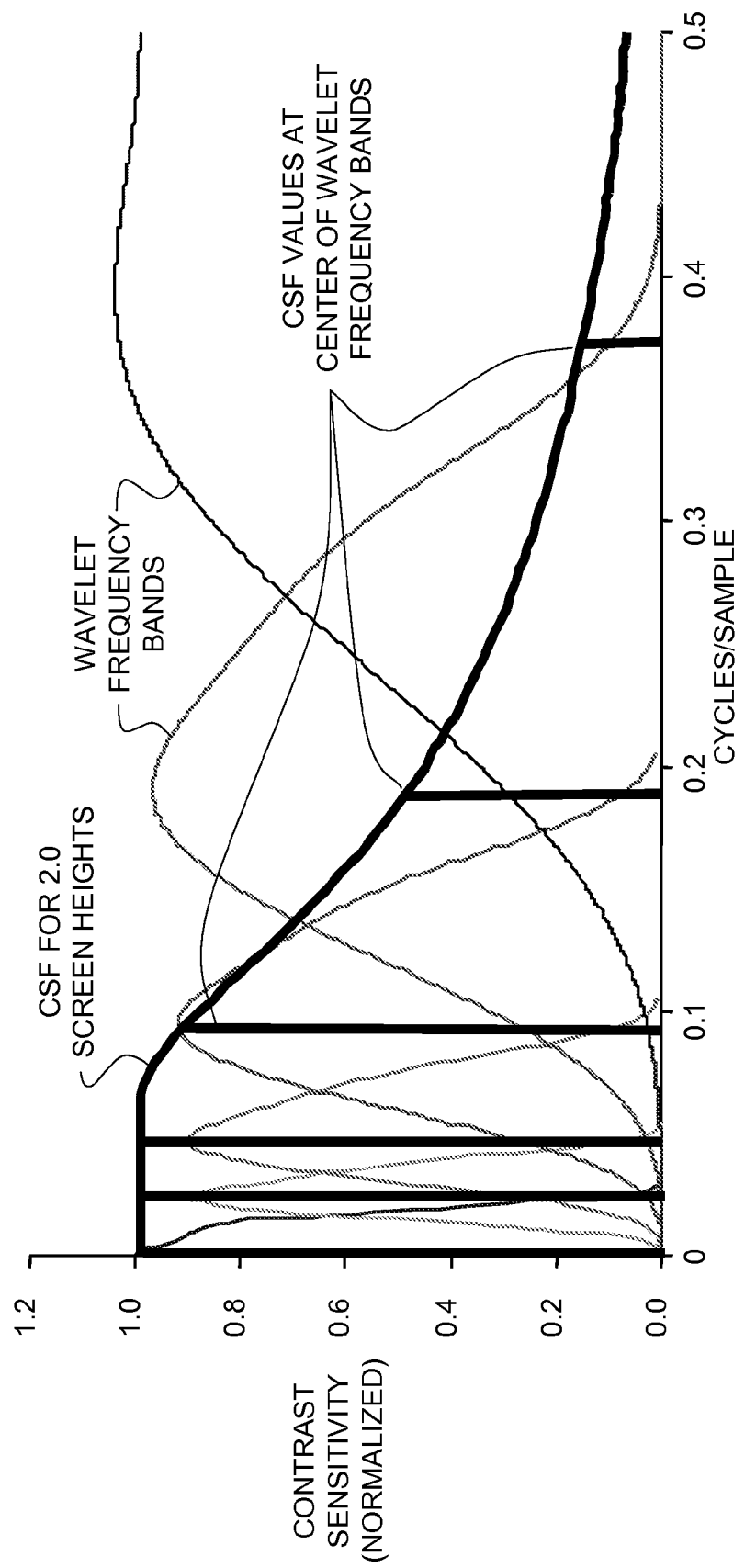
FIG. 6 is an example of mapping the contrast sensitivity function values to individual wavelet subbands.

FIG. 6 illustrates a mapping where the center frequency of each subband is used; the CSF in this example is for a viewing distance of 2.0 screen heights. Other mappings are possible, e.g., using a lower frequency than the center frequency to be more conservative in defining the sensitivity to the errors that arise in each subband.

It is important to note that in applying the CSF to the present invention, the envelope of all CSFs with a viewing distance greater than a specified viewing distance is used. An example of a low frequency CSF envelope is illustrated in FIG. 5 for a viewing distance of 0.5 PH. The use of this envelope has the effect of removing the low frequency roll-off of the CSF, so that an image that has been compressed for an intended viewing distance D will still be visually lossless for all viewing distances greater than D. The intended viewing distance D is also referred to as the threshold viewing distance, because any closer viewing distances may reveal contrast errors that are present in the decompressed displayed image. The quantizer step sizes that are derived using the threshold viewing distance and other associated viewing conditions are referred to as the threshold quantizer step sizes. Threshold viewing distance is a precise way to specify image quality as it provides a meaningful, physical quantity that indicates under what viewing conditions a compressed image will be visually lossless as compared to the original uncompressed image. This is in contrast to techniques that rely strictly upon MSE or PSNR metrics, which provides little information as to the suitability of an image for specific display conditions.

Once the CSF values that correspond to the wavelet subbands are known, it is then possible to compute the corresponding set of quantizer step sizes that will produce visually lossless quality for the specified viewing conditions. To perform this computation there are two other relationships that must be characterized.

Figure 7:
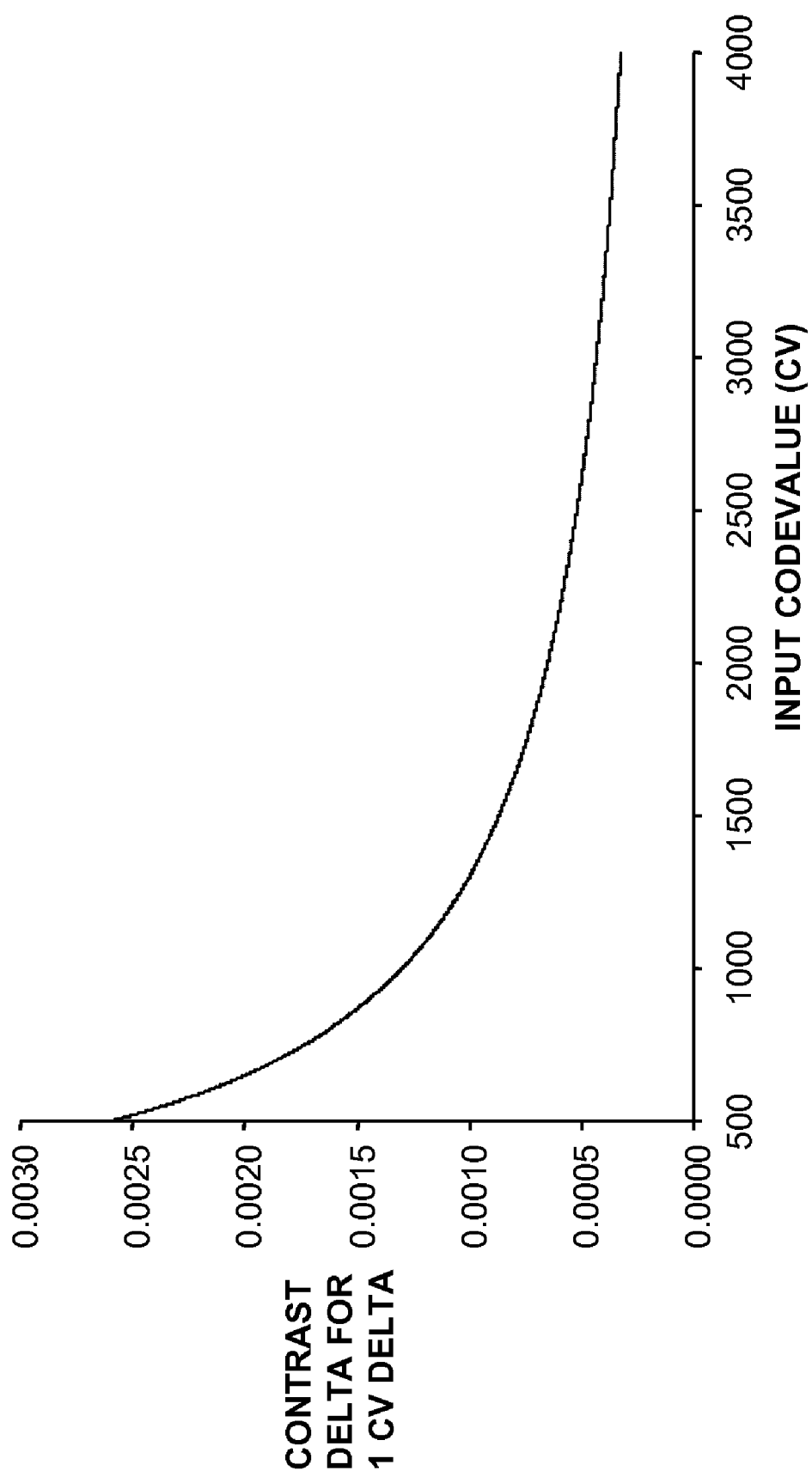
FIG. 7 is an example of the contrast delta that is produced by a delta of one codevalue as input to a display as a function of the input level.

The first is a characterization of the display in terms of the contrast changes in the displayed image that are produced by codevalue changes at the input to the display. Specifically, we need to know the displayed contrast delta for an input delta of one codevalue (CV). As it turns out, this relationship is a function of the signal level at which the one CV delta occurs, and this is illustrated in FIG. 7 for 12-bit data that is displayed with gamma of 2.6. It can be seen that the maximum contrast change is produced at low CVs (the shadow regions), but an observer is more likely to be adapted to a higher brightness level. Because of this, a mid-scale input level can be selected to establish the contrast/CV relationship.

The second is a characterization of the JPEG2000 encoder/decoder system in terms of the CV changes that are produced in a decompressed image for a given quantizer step size. Specifically, one needs to know the quantizer step size, Q(f), for each wavelet subband that will produce a one CV delta in the decompressed image. These values can be determined either by direct numerical calculations or through simple experimentation. The specific quantizer step sizes that produce a one CV delta will depend upon the JPEG2000 implementation and also the wavelet filter, (e.g., the 9-7 filter in the case of DCI-compliant systems).

Figure 8:
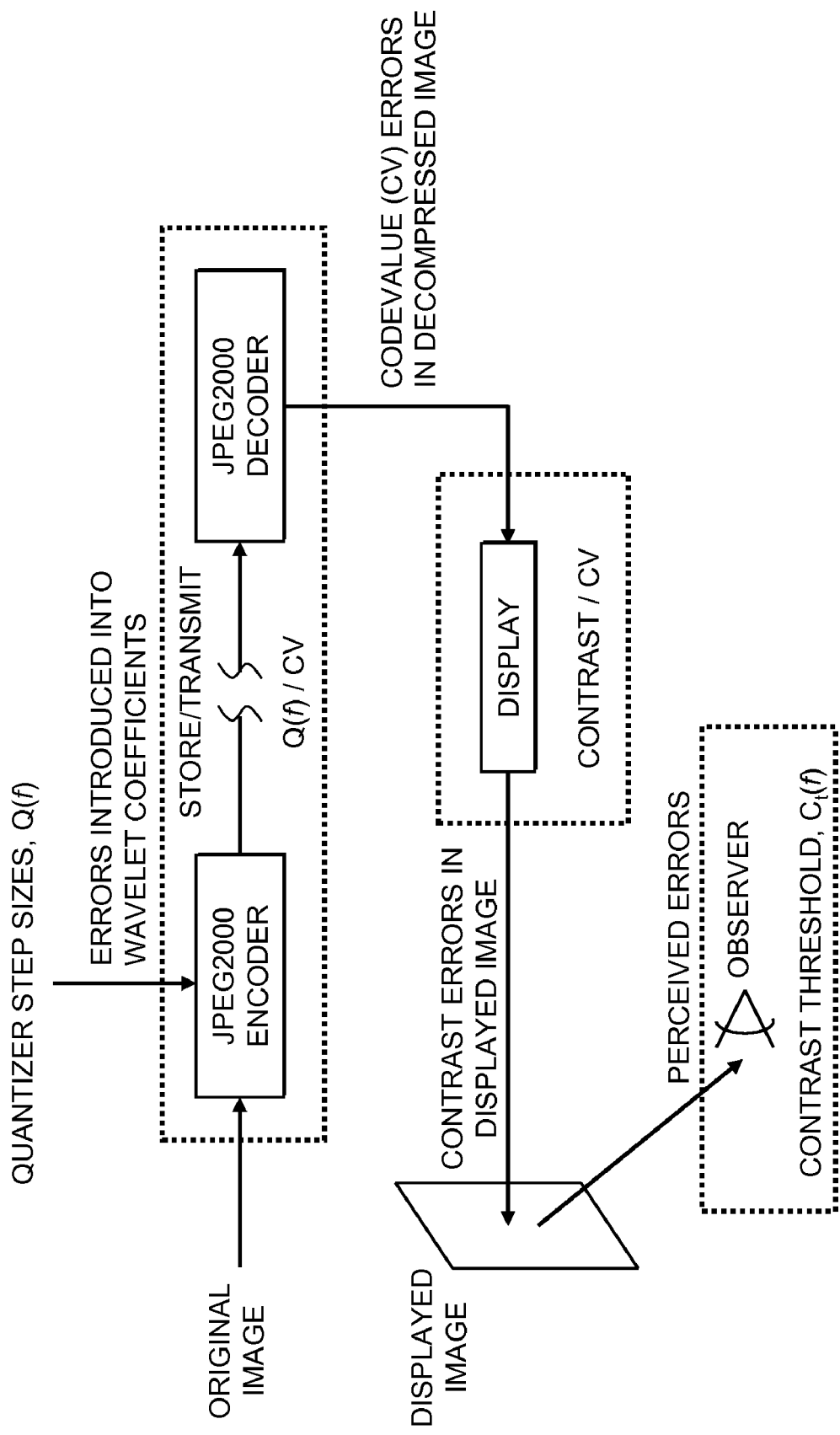
FIG. 8 is an illustration of the observer response and the characterizations of the encoder/decoder system and the display.

After determining these two characterizations, one can subsequently combine them with the CSF values to determine the actual threshold quantizer step sizes that needed for visually lossless compression. Referring to FIG. 8, and also FIG. 2, the JPEG2000 encoder/decoder system is characterized by the quantizer step size for each wavelet subband that leads to a one CV delta (Q(f)/CV) in the decompressed image. The display is characterized by the contrast delta for a one CV input delta (Contrast/CV), and the observer is characterized by the threshold contrast ($C_t(f)$) for each subband, which can be determined from the CSF by inverting Eq. 2. Given these relationships, the threshold quantizer step size $Q_t(f)$ for a given wavelet subband is:

$$Q_t(f) = \frac{[Q(f)/CV] \cdot [C_t(f)]}{[Contrast/CV]}. \qquad (4)$$

Figure 9:
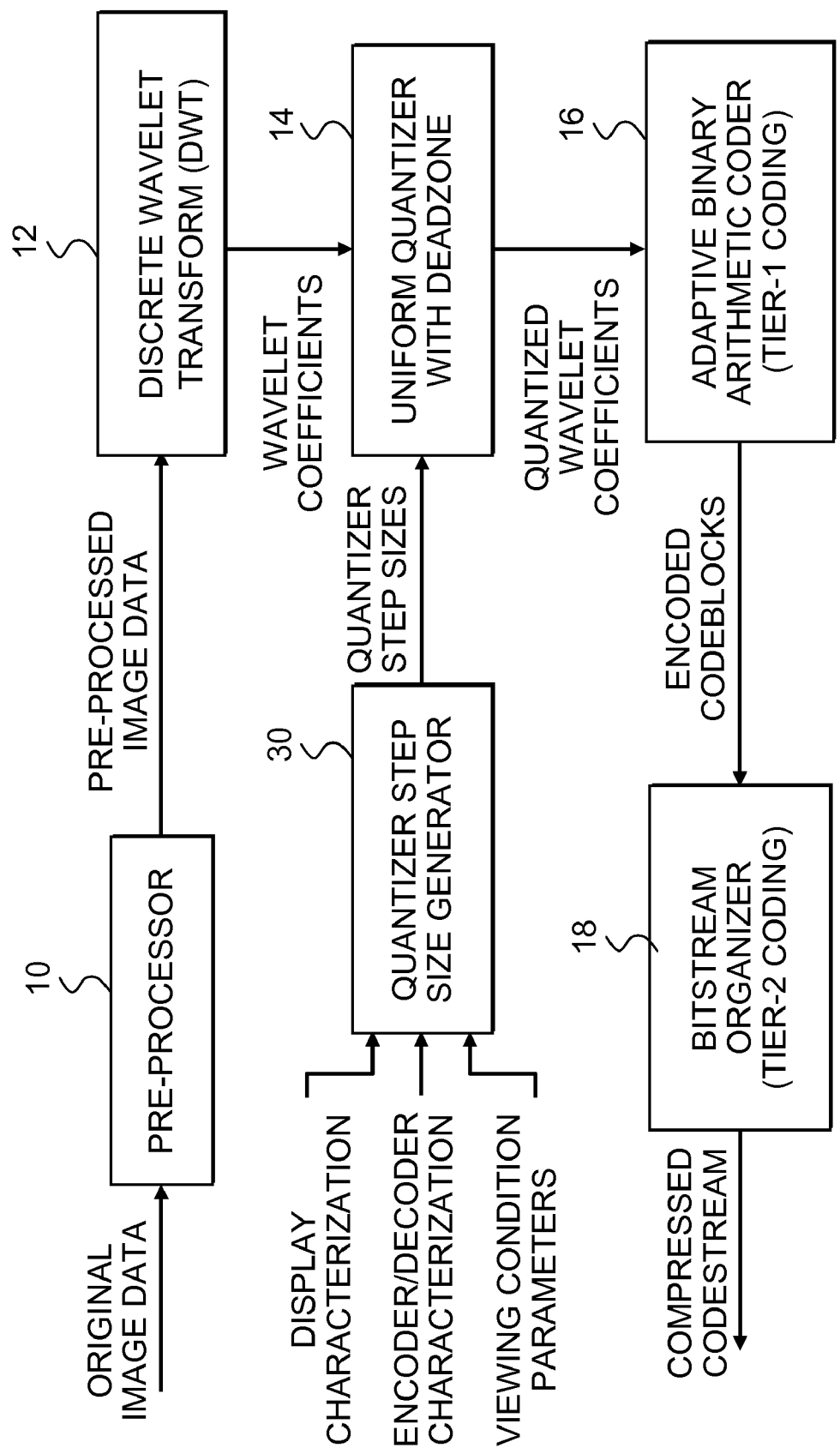
FIG. 9 is a block diagram of the present invention illustrating the generation of quantizer step sizes using viewing condition parameters and the characterizations of the encoder/decoder system and the display.

As illustrated in FIG. 9, the present invention includes a quantizer step size generator 30 in addition to the JPEG2000 encoder elements that are depicted in FIG. 1. The quantizer step size generator 30 generates the quantizer step sizes applied to the frequency subbands in the wavelet coefficient quantizer 14. The inputs to the quantizer step size generator are the viewing condition parameters (which includes the viewing distance in picture heights, screen heights, or similar units), the display characterization of the contrast delta for a one CV input delta, and the JPEG2000 encoder/decoder system characterization of the quantizer step sizes that produces a one CV delta in the decompressed image.

Figure 10:
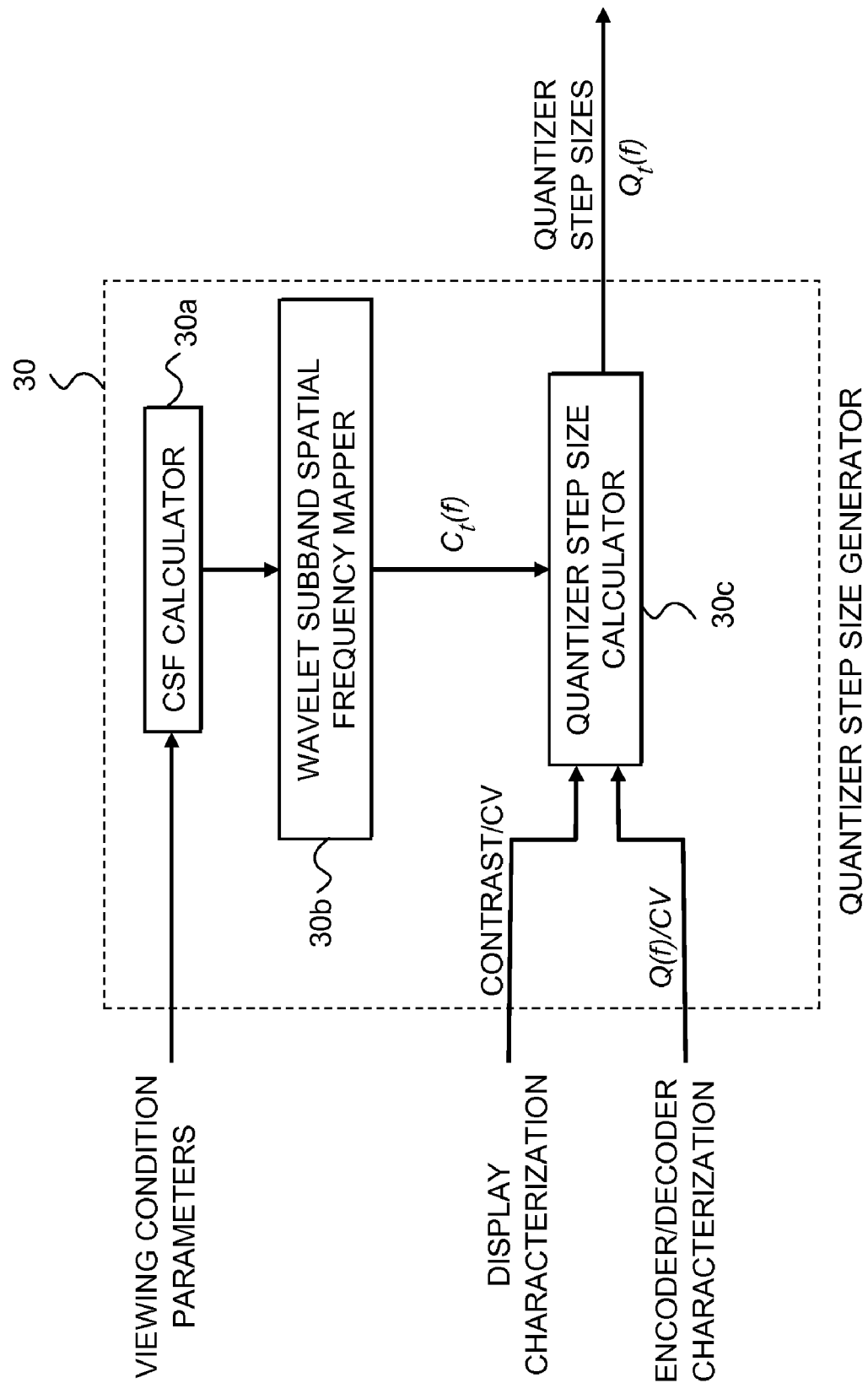
FIG. 10 is a block diagram of the quantizer step size generator of the present invention.

Referring to FIG. 10, the quantizer step size generator 30 shown in FIG. 9 includes: a CSF calculator (30a) that takes the viewing condition parameters as input; a wavelet subband spatial frequency mapper (30b) that uses the CSF values to determine the contrast thresholds $C_t(f)$ for each of the wavelet subbands; and a quantizer step size calculator (30c) that uses the display characterization (Contrast/CV); the JPEG2000 encoder/decoder characterization (Q(f)/CV); and the contrast thresholds ($C_t(f)$) to calculate the quantizer step sizes for the wavelet subbands using the formula given in Eq. 4.

The present invention has the advantage of the viewing distance being specified in picture heights, screen heights, or similar units that are independent of the specific size of the display, or that may be a function of the display size. In an application such as the projection of movies, using a Digital Cinema system, a movie can be compressed with the present invention to a quality level that is specified by a threshold viewing distance, and a customer is assured that the image quality will be the same regardless of the screen size on which the movie is shown. Another advantage is that the present invention can be practiced with most JPEG2000 encoders without any modifications as most encoders are designed to accept user-specified quantizer step sizes as input values.

In one embodiment of the present invention, the intended viewing conditions are specified and the corresponding threshold quantizer step sizes are determined from the CSF model and the other system characterizations as described previously. These step sizes are used to compress an image so that the decompressed and displayed image will have perceived quality that is identical to the original, uncompressed image when both images are viewed under the intended display conditions, i.e., the compression is visually lossless for the intended display conditions. In this approach, overcoding is minimized, because the threshold quantizer step sizes will produce the minimum amount of information that is need for the desired quality level, and thus the Tier-1 coding encodes only this minimum amount of information. This compression system is inherently a VBR system, because the amount of compressed data in the final codestream will depend upon the image content.

However, even with this type of VBR system, it may still be the case that there is a constraint on the maximum amount of compressed data for each image, as such is the case for DCI-compliant codestreams for JPEG2000 compression of image sequences. To meet such a constraint, the present invention includes an additional rate control algorithm such as PCRD-opt during Tier-2 encoding to insure that all size constraints are met. The amount of compressed data can be compared to a pre-specified maximum amount, and the rate control during Tier-2 coding can reduce the amount of compressed data, if the maximum amount is exceeded. For a visually lossless VBR system as described in the present invention, these maximum size constraints are typically larger than the actual compressed size, because the visually based quantization will produce small compressed sizes for most image content. Thus, trimming of additional compressed data during Tier-2 coding typically doesn't occur and will be minimal even in the worst case, so overcoding is minimal.

In the case where trimming of compressed data occurs, because of the codestream size constraints, the resulting image is no longer assured to be visually lossless for the intended viewing conditions. It is possible, however, to compute a new threshold viewing distance for such modified images, using the method described in U.S. Pat. No. 6,650, 782, as a way to quantify the possible losses in image quality. However, for DCinema applications using the DCI-specified size constraints, trimming of the compressed data is infrequent for typical viewing conditions; moreover, the amount of trimming is small even when it does occur. Thus, in practice, this VBR method provides nearly constant perceived quality, which is visually lossless for the specified threshold viewing distance (and all greater viewing distances) for the majority of images that are compressed.

In another embodiment of the present invention, the intended viewing conditions are specified and the quantizer step sizes are chosen to provide slightly finer quantization than is needed for visually lossless compression under the intended viewing conditions. In this approach, there is some amount of overcoding, but it is constrained because the quantizer steps sizes are still derived from a human visual system model and the intended viewing conditions. This type of compression system is specifically designed to allow for trimming of the compressed data during Tier-2 coding to achieve a fixed size for the amount of compressed data in the final codestream. By providing a limited amount of overcoding for each image, the amount of compressed data can be trimmed to a fixed size, thus producing a CBR system. However, this approach is still much more efficient than typical JPEG2000 CBR systems, which use very fine quantization and produce a large amount of unused compressed data.

One way to produce a limited amount of overcoding for a CBR system is to first generate the threshold quantizer step sizes for visually lossless quality at the intended viewing distance as would be done for the VBR system described previously. These threshold quantizer step sizes can then be scaled to produce smaller quantizer step sizes that yield a controlled amount of overcoding. The ratio of the overcoded quantizer step size to the corresponding threshold quantizer step size for each frequency subband will always be less than or equal to 1.0. In practice, a ratio between approximately 0.1 to 0.3 has been found to provide a good balance between the amount of overcoding and the ability to achieve a constant compressed size for CBR coding. This ratio defines the scaling factor that is used to scale a threshold quantizer step size.

The same scaling factor can be used for all of the quantizer step sizes, or it may also be advantageous to adjust the scaling factor as a function of the spatial frequency that is associated with each wavelet frequency subband. For example, the amount of overcoding might be increased at the lower spatial frequencies to provide more precise adjustment of those frequencies, while the higher frequencies are quantized using the threshold quantizer step sizes to minimize overcoding of the higher frequencies. Because there are fewer low frequency coefficients, the computational complexity is not greatly increased, but a constant compressed codestream size can still be achieved by reducing the amount of compressed data only for the lower frequencies. Alternatively, one might permit overcoding for the high spatial frequency subbands, but use no overcoding for the low spatial frequency subbands. The low frequency subbands could then be excluded from any trimming during the rate control process so that the desired level of perceived image quality is always maintained for these low frequency subbands, and yet there is sufficient overcoding of the higher frequency subbands to allow for trimming to a desired codestream size, while still achieving high quality.

Regardless of the exact strategy for overcoding with a CBR system, by using scaled versions of the threshold quantizer step sizes, it is advantageous to constrain the number of bitplanes that can be discarded; so that the effective quantizer step size for any coefficient is constrained to a value that is less than or equal to the corresponding threshold quantizer step size. For example, consider the case where a given subband i has a corresponding threshold quantizer step size of $\Delta_i$, and the scaled quantizer step size that is used to introduce a controlled amount of overcoding is $(¼)·\Delta_i$. At most, two least significant bitplanes can be discarded for any coefficient in subband i, because the resulting effective quantizer step size is $2^2·(¼)·\Delta_i=\Delta_i$. In this way, the resulting decompressed image still achieves visually lossless quality for the specified viewing conditions, although the amount of compressed data with this type of CBR system will typically be larger than that produced by a VBR system under the same viewing conditions.

While the aforementioned embodiments of the present invention overcome a limitation of the prior art by reducing the computational complexity, these embodiments may still make use of a PCRD-opt or a similar rate control algorithm during Tier-2 coding to ensure that constraints on the maximum compressed codestream size are met. This is an advantageous way to meet size constraints as most JPEG2000 encoders include some form of PCRD-opt, and thus the present invention can be practiced with such encoders without further modification.

As noted previously, PCRD-opt uses MSE as the distortion metric, and MSE may not necessarily correlate well with perceived quality. However, the use of PCRD-opt and MSE in trimming the encoded data with the present invention is much less of a problem than it is in typical JPEG2000 encoder that produce finely quantized wavelet coefficients. With prior art methods, every coding decision is based upon MSE (and the corresponding rate changes) when compressed data is discarded, and there is no assurance that such coding decisions will lead to perceived image quality that is optimal for the size of the final compressed codestream. In contrast, the present invention makes the majority of the coding decisions during the quantization phase. As a result, the data that is passed to the Tier-1 coding, and subsequently to the Tier-2 coding has already been restricted to a limited amount of data that has a very strong perceptual relevance.

In the case of VBR coding with the present invention, the amount of trimming in Tier-2 coding is inconsequential for most images, so the resulting compressed image will provide nearly constant perceived quality. The amount of overcoding for CBR coding is also minimized, because again most of the coding decisions are made during the quantization phase. In addition, CBR encoding is typically designed to operate with larger compressed codestream sizes than VBR encoding, so image quality is usually higher than is needed for the intended viewing conditions. Moreover, because the wavelet coefficients are already quantized according to a perceptual model, the coding decisions that are made during Tier-2 coding with CBR coding within the present invention are more relevant in terms of perceived quality.

Figure 11:
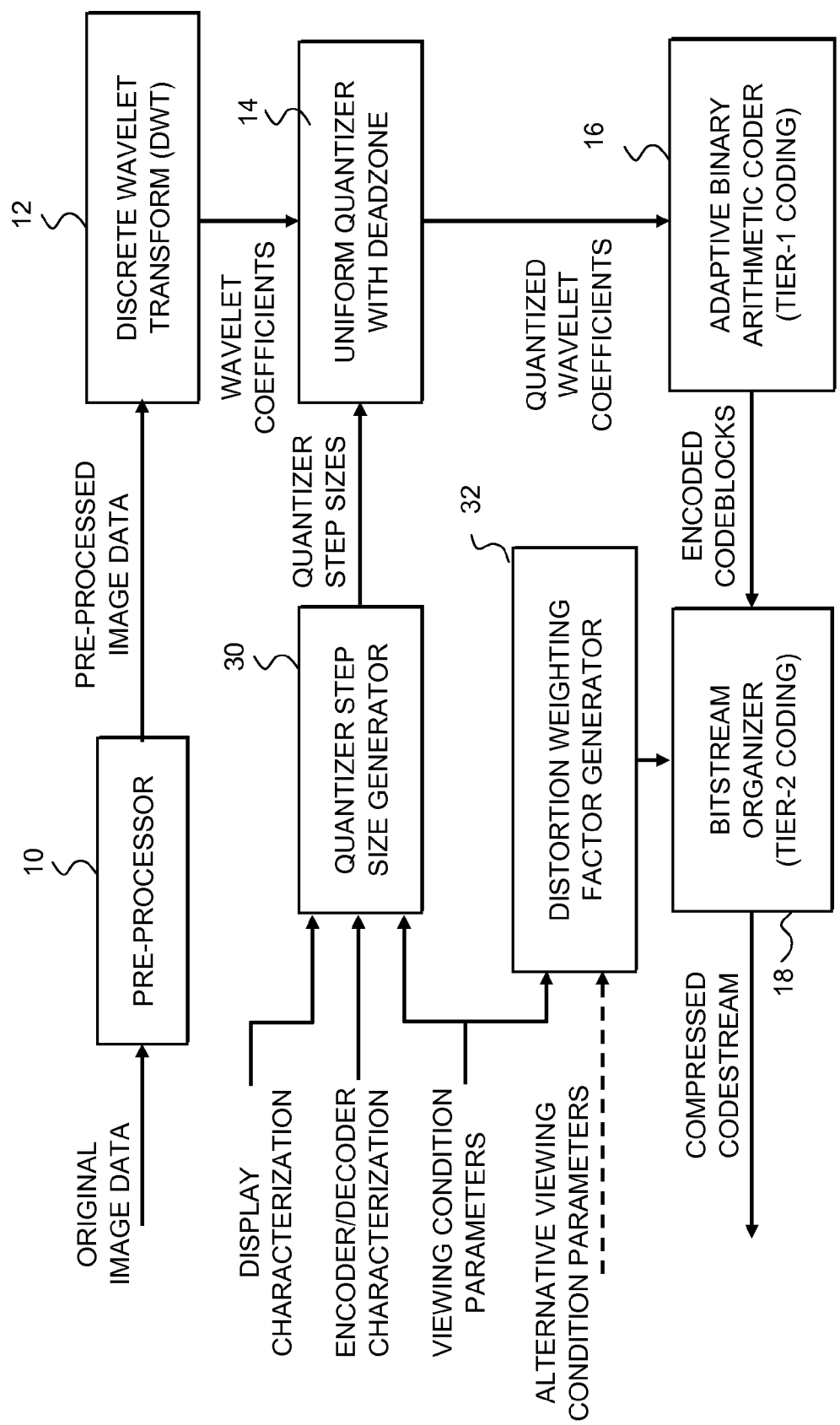
FIG. 11 is a block diagram of the present invention illustrating the generation of distortion weighting factors using viewing condition parameters.

To ensure that any coding decisions that are made during Tier-2 coding, whether for CBR or VBR, are optimal in terms of image quality, one can further employ a visual model during Tier-2 coding. This is accomplished by using visually based distortion weighting factors when computing the distortion for a PCRD-opt algorithm or a similar method. A distortion weighting factor can be assigned to each wavelet frequency subband, and the weighting factor is then used to determine the reduction in MSE that is contributed by a particular coefficient in a given subband. This process is illustrated in FIG. 11, where the viewing conditions are input parameters to a distortion weighting factor generator 32 that generates the visually based weighting factors to be used by a PCRD-opt or similar algorithm in Tier-2 coding. The human visual system model that is used to determine the weighting factors is typically based upon a CSF model and was described previously by referring to FIG. 1. However, it should be noted that the quantizer step sizes and the weighting factors for the various frequency subbands are not the same value; nor do they necessarily share the same relationship across all of the subbands. This is because the processes of quantization and visual weighting of MSE are fundamentally different, so the relationships of the subbands to one another are different for the two processes.

The use of visually based weighting factors for MSE distortion calculations is well known in the prior art; but the use of a threshold viewing distance in determining both the visually based quantization of the wavelet coefficients as practiced in the present invention and the subsequent coding decisions based upon visually weighted MSE provides advantages over the prior art. As discussed previously, by limiting the amount of overcoding using a visual model for the intended viewing conditions, the resulting compressed codestream is nearly optimal in terms of perceived quality and size for those viewing conditions. If it is necessary to trim compressed data to meet constraints on the maximum amount of compressed data, the visual weighting of the MSE can help ensure that the discarded data will have the least effect on the perceived image quality that is produced by smaller compressed codestream.

As illustrated in FIG. 11, one could use the same viewing conditions and the same visual model to determine the distortion weighting factors that were used for determining the quantizer step sizes. The effect of using visually based weighting factors that are derived from same viewing conditions is that the distortions corresponding to the higher spatial frequencies are typically weighted to lower values; meaning that the compressed data for the higher spatial frequencies will be preferentially discarded during the rate-distortion optimization of PCRD-opt. This leads to images that may have slightly lower sharpness than desired, but it minimizes the potential for objectionable artifacts to be introduced. Observers are more tolerant of a slight loss of image sharpness than they are to unnatural coding artifacts.

However, it can also be advantageous to use one or more alternative viewing condition parameters to derive the weighting factors for the distortion calculations, as also illustrated in FIG. 11. An example of this approach is determining the weighting factors using a greater viewing distance than the threshold viewing distance that was used to generate the quantizer step sizes. With this method, compressed data that corresponds to the higher spatial frequencies are much more likely to be discarded than the data for the lower spatial frequencies in meeting the compressed size constraint. This is particularly important for VBR coding, where the coefficients have already been quantized to threshold levels. Any additional compression errors will occur at the higher frequencies with the visual weighting that was just described, which is equivalent to quantizing according to a greater threshold viewing distance than was originally specified. Again, this type of data reduction discards the least perceptually relevant compressed data.

It can be further advantageous to apply very large weighting factors to the lower spatial frequency subbands to fully ensure that no data is discarded from these subbands. When the low frequency subbands are already quantized to visually lossless levels, it is preferable to not introduce any additional distortion into these frequency subbands as the resulting image quality can be significantly affected. However, whether the same or different viewing conditions are used when calculating the visually based quantizer step sizes and weighting factors, the effect of the visual weighting factors is to ensure that the least perceptually relevant data is discarded when trimming the compressed data to meet a maximum codestream size constraint.

In the preceding discussion, no mention has been made of the color components that typically comprise an image. In an exemplary embodiment of the present invention, a separate set of quantizer step sizes is determined for each color component, where each set is tuned for the overall compression/decompression/display chain. For example, the three sets of optimal quantizer step sizes for an image compressed as RGB color channels are different from the sets of optimal quantizer step sizes for an image that has been pre-processed with the ICT to convert the RGB data to YCbCr data prior to compression. This is because the errors that are introduced into the quantized wavelet coefficients for each color channel are amplified or diminished in different ways as the compressed data is decompressed, and if necessary, processed with the inverse ICT before converting to color signals for the display. Similar variations in the perceptibility of errors in the different color channels occur for data representing image color components that correspond to a different color primary set (such as XYZ instead of RGB) and for displays with different primary sets (e.g., RGB P3 or RGB 709 primaries). Likewise, it is desirable to adjust the visual weighting factors for any MSE calculations based upon the properties of the different color channels, because some color channels are perceptually more important, e.g. the green color channel, while other are less perceptually relevant, e.g., the blue color channel. Given knowledge of the specific image color representation and display color characteristics, it is straightforward to determine the optimal quantizer step sizes and weighting factors for the different color channels through either direct numerical calculations or simple observer experiments.

Although it is preferable to determine separate quantizer step sizes for each frequency subband in each color channel, one may be required to use only a single set of quantizer step sizes, because of the limitations of some manufacturers' JPEG2000 decoders (i.e., they can only read a single set of quantizer step sizes). In this case, one finds the minimum quantizer step size for each frequency subband across all color channels. This set of minimum step sizes is used to quantize each of the color channels. This insures that threshold level of quality will be met for the intended viewing conditions; but it comes at a price of an inflated compressed codestream size and/or additional overcoding.

Accordingly, what is provided is a method for controlling the compressed size of JPEG2000 images in a manner that is more efficient than existing encoders, and the method also ensures that the size of the compressed data meets any constraints on the maximum amount of compressed data. In at least one embodiment, the method provides nearly constant perceived image quality with the minimum amount of compressed data that is needed for the desired quality.

The method can be applied to both single-frame images or to motion image sequences, with the same computational advantages in either case. Moreover, the present invention can be practiced with most existing JPEG2000 encoders, both hardware and software. The only requirements are that the encoder: (1) accepts explicit quantizer step sizes as inputs to the quantizer and (2) provides a means for reducing the amount of compressed data, if pre-specified maximum limits for compressed data are exceeded, where such means include, but are not limited to, common rate control techniques such as PCRD-opt.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Other aspects of such algorithms and systems, and hardware and/or software for producing and otherwise processing the images involved or co-operating with the computer program product of the present invention, are not specifically shown or described herein and may be selected from such algorithms, systems, hardware, components, and elements known in the art.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the Internet or other communication medium. Those skilled in the art will readily recognize that the equivalent of such a computer program product may also be constructed in hardware or firmware known as application specific integrated circuits (ASICs) or as programmable digital logic chips, such as field programmable gate arrays (FPGAs).

The invention has been described in detail with particular reference to certain preferred embodiments thereof, but it will be understood that variations and modifications can be effected within the spirit and scope of the invention.

PARTS LIST

10 Pre-processor
12 Discrete wavelet transform
14 Uniform quantizer with dead zone
16 Adaptive binary arithmetic coder
18 Bitstream organizer
20 JPEG2000 encoder
22 JPEG2000 decoder
24 Display device
30 Quantizer step size generator
30a CSF calculator
30b Wavelet subband spatial frequency mapper
30c Quantizer step size calculator
32 Distortion weighting factor generator

The invention claimed is:

1. A method for controlling the amount of compressed data that is used to represent an image when the image is compressed as a plurality of frequency subbands and subsequently decompressed and viewed on a display by a human observer, comprising the steps of:
 (a) specifying one or more viewing condition parameters;
 (b) determining a quantizer step size for each frequency subband that minimizes an amount of data that must be encoded for a compressed representation of the image by using the one or more viewing condition parameters and a model that characterizes the human visual system;
 (c) using an image processor to compress the image using the quantizer step size for each frequency subband to produce an amount of compressed data;
 (d) comparing a pre-specified maximum amount of compressed data to the amount of data produced by using the quantizer step size; and
 (e) if the amount of compressed data exceeds the pre-specified maximum amount, reducing the amount of compressed data by discarding least visually relevant compressed data so that the amount of compressed data is less than or equal to the pre-specified maximum amount.

2. The method according to claim 1, wherein the one or more viewing condition parameters include a threshold viewing distance.

3. The method according to claim 2, wherein the threshold viewing distance is specified in screen heights.

4. The method according to claim 2, wherein the threshold viewing distance is specified in picture heights.

5. The method according to claim 2, wherein the threshold viewing distance is specified in displayed pixels.

6. The method according to claim 1, wherein the step of reducing the amount of compressed data comprises applying post-compression rate-distortion optimization.

7. The method according to claim 6, wherein the post-compression rate-distortion optimization uses distortion weighting factors that are calculated using the model of the human visual system and one or more viewing condition parameters.

8. The method according to claim 7, wherein the one or more viewing condition parameters that are used to calculate the distortion weighting factors are the same as the one or more viewing condition parameters that are used to determine the quantizer step sizes.

9. The method according to claim 7, wherein the one or more viewing condition parameters that are used to calculate the distortion weighting factors include at least one viewing condition parameter that is different from the one or more viewing condition parameters that are used to determine the quantizer step sizes.

10. The method according to claim 1, wherein the quantizer step size for each frequency subband is a threshold step size for the specified viewing condition parameters.

11. The method according to claim 1, wherein the quantizer step size for each frequency subband is less than a corresponding threshold step size for the specified viewing condition parameters.

12. The method according to claim 11, wherein the ratio of the quantizer step size for each frequency subband to the corresponding threshold step size is a constant value less than or equal to 1.0.

13. The method according to claim 1, wherein the original image has three or more color channels and the step of determining a quantizer step size for each frequency subband further includes determining a separate quantizer step size for each frequency subband of the three or more ecilor channels.

14. The method according to claim 13, wherein the step of determining a quantizer step size for each frequency subband further includes determining a single quantizer step size for corresponding frequency subbands across the three or more color channels by selecting the minimum value of the separate quantizer step sizes for corresponding frequency subbands.

15. A computer readable medium useful in association with a computer system that includes a processor and a memory, the computer readable medium including computer instructions for controlling the amount of compressed data that is used to represent an image when the image is compressed as a plurality of frequency subbands and subsequently decompressed and viewed on a display by a human observer by:
 (a) specifying one or more viewing condition parameters;
 (b) determining a quantizer step size for each frequency subband that minimizes an amount of data that must be encoded for a compressed representation of the image by using the one or more viewing condition parameters and a model that characterizes the human visual system;
 (c) compressing the image using the quantizer step size for each frequency subband to produce an amount of compressed data;
 (d) comparing a pre-specified maximum amount of compressed data to the amount of compressed data produced by using the quantizer step size; and
 (e) if the amount of compressed data exceeds the pre-specified maximum amount of compressed data, reducing the amount of compressed data by discarding least visually relevant compressed data so that the amount of compressed data is less than or equal to the pre-specified maximum amount of compressed data.

16. The computer readable medium according to claim 15, wherein the one or more viewing condition parameters include a threshold viewing distance.

17. The computer readable medium according to claim 16, wherein the threshold viewing distance is specified in screen heights.

18. The computer readable medium according to claim 16, wherein the threshold viewing distance is specified in picture heights.

19. The computer readable medium according to claim 16, wherein the threshold viewing distance is specified in displayed pixels.

20. The computer readable medium according to claim 15, wherein the step of reducing the acceptable amount of compressed data includes applying post-compression rate-distortion optimization.

21. The method claimed in claim 1, wherein the model that characterizes the human visual system is a contrast sensitivity function.

22. The method claimed in claim 1, wherein the model that characterizes the human visual system is used to determine both the quantizer step size, and distortion weighting factors that enable reduction of the amount of compressed data when it initially exceeds the pre-specified maximum amount of compressed data.

23. The computer readable medium claimed in claim 15, wherein the model that characterizes the human visual system is a contrast sensitivity function.

24. The computer readable medium claimed in claim 15, wherein the model that characterizes the human visual system is used to determine both the quantizer step size, and distortion weighting factors that enable reduction of the amount of compressed data when it initially exceeds the pre-specified maximum amount of compressed data.

* * * * *

UNITED STATES PATENT AND TRADEMARK OFFICE
CERTIFICATE OF CORRECTION

PATENT NO. : 7,729,551 B2 Page 1 of 1
APPLICATION NO. : 11/517978
DATED : June 1, 2010
INVENTOR(S) : Paul W. Jones It is certified that error appears in the above-identified patent and that said Letters Patent is hereby corrected as shown below:

Issued Patent | | Description of Error
Column | Line |
16 | 24 | In Claim 13, delete "ecilor" and insert -- color --

Signed and Sealed this

Thirteenth Day of July, 2010

David J. Kappos
*Director of the United States Patent and Trademark Office*